United States Patent
Cooper (10) Patent No.: US 10,656,297 B2
(45) Date of Patent: May 19, 2020

(54) SELF-TUNING SONIC TRANSMITTERS

(71) Applicant: HALLIBURTON ENERGY SERVICES, INC., Houston, TX (US)

(72) Inventor: Paul Andrew Cooper, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/545,778

(22) PCT Filed: Feb. 22, 2016

(86) PCT No.: PCT/US2016/018943
§ 371 (c)(1),
(2) Date: Jul. 24, 2017

(87) PCT Pub. No.: WO2017/146674
PCT Pub. Date: Aug. 31, 2017

(65) Prior Publication Data
US 2018/0120463 A1  May 3, 2018

(51) Int. Cl.
*G01V 1/48* (2006.01)
*G01V 1/46* (2006.01)

(52) U.S. Cl.
CPC .............. *G01V 1/46* (2013.01); *G01V 1/48* (2013.01); *G01V 2200/16* (2013.01); *G01V 2210/41* (2013.01); *G01V 2210/6222* (2013.01)

(58) Field of Classification Search
CPC .................................. G01V 1/46; G01V 1/48
See application file for complete search history.

(56) References Cited

U.S. PATENT DOCUMENTS

| | | | |
|---|---|---|---|
| 5,077,697 A * | 12/1991 | Chang | G01V 1/005 367/31 |
| 6,434,084 B1 | 8/2002 | Schultz | |
| 6,510,104 B1 * | 1/2003 | Ikegami | G01V 1/46 181/102 |
| 8,730,763 B2 | 5/2014 | Johnson | |
| 2003/0053529 A1 | 3/2003 | Nantz et al. | |
| 2004/0145503 A1 | 7/2004 | Blanch et al. | |
| 2006/0062081 A1 | 3/2006 | Wu et al. | |
| 2012/0287754 A1 | 11/2012 | Johnson | |

(Continued)

FOREIGN PATENT DOCUMENTS

| | | |
|---|---|---|
| CN | 2632687 Y | 8/2004 |
| CN | 102288277 A | 12/2011 |
| WO | 0194983 A2 | 12/2001 |

OTHER PUBLICATIONS

International Search Report and Written Opinion; PCT Application No. PCT/US2016/018943; dated Nov. 18, 2016.

(Continued)

*Primary Examiner* — Ian J Lobo
(74) *Attorney, Agent, or Firm* — Polsinelli PC (57) ABSTRACT

A system for self-tuning sonic transmitters which transmits a plurality of frequencies into a downhole formation, then identifies which of the transmitted frequencies generates the best response from the formation. The system then uses the best frequency identified for subsequent logging of formation data until a subsequent tuning sequence is initiated.

20 Claims, 6 Drawing Sheets

(56) References Cited

U.S. PATENT DOCUMENTS

2014/0246237 A1  9/2014  Pramer

OTHER PUBLICATIONS

Office Action regarding CN Application No. 201680078502.3 dated May 23, 2019; 18 pages.
English abstract of CN2632687; retrieved from www.espacenet.com on Aug. 27, 2019.
English translation of specification of CN102288277; retrieved from www.espacenet.com on Aug. 27, 2019.

* cited by examiner

SELF-TUNING SONIC TRANSMITTERS

CROSS-REFERENCE TO RELATED APPLICATIONS

This application is a national stage entry of PCT/US2016/018943 filed Feb. 22, 2016, said application is expressly incorporated herein in its entirety.

TECHNICAL FIELD

The present disclosure relates to sonic measurements of downhole formation properties, and more specifically to optimizing acoustic measurements of formation properties using frequency responses of the formation.

BACKGROUND

In acoustic well logging, an acoustic signal can be used to generate compressional and shear waves in downhole formations. The velocity of such waves can be logged as they travel through the formation, allowing properties such as bulk modulus, Poisson's ratio, porosity, rock mechanics, and pore pressure to be calculated. Logged information improves as the frequency used for the acoustic signal is closer to the formation resonance frequency. However, formation resonance frequency can vary greatly over the course of a run, which can result in logged data of an inferior quality.

DETAILED DESCRIPTION

Various embodiments of the disclosure are described in detail below. While specific implementations are described, it should be understood that this is done for illustration purposes only. Other components and configurations may be used without parting from the spirit and scope of the disclosure, and characteristics/configurations of the exemplary implementations provided are not exclusive to the implementation in which they are presented.

A system, method and computer-readable storage devices are disclosed which identify a best, or optimal, firing frequency for acoustic resonance of well environments. As an example, a system configured according to this disclosure can transmit multiple acoustic signals into a formation. The system then receives the acoustic waves which pass through the formation and determines, based on the resonance of the formation with respect to each wave, which frequency best excites the formation. The system can then use that optimal frequency for logging information about the formation until a subsequent optimal frequency test is performed. In this manner, the data recorded about the formation is obtained using the best frequency for that portion of the formation.

In other words, the downhole tool fires off multiple different frequency transmissions into the rock formation as part of a frequency tuning sequence, identifies which frequencies cause the most resonance within the formation, and uses the best frequency to study the formation until a subsequent frequency tuning sequence. Thus, in one example, the downhole tool identifies the best resonance frequency every five minutes by probing several frequencies and analyzing the formation response to those probes. The downhole tool then uses that best frequency to continue analyzing the formation until the five minutes are up, at which time the downhole tool repeats the frequency tuning to ensure the best frequency is being used for probing the well formation.

Consider the following configuration. A system configured according to this disclosure initiates, at a first time and in a downhole location, a first tuning sequence, and transmits a plurality of frequencies via a firing mode to a downhole formation. The system records, based on the plurality of frequencies, a frequency response of the downhole formation for each frequency in the plurality of frequencies, to yield a plurality of frequency responses, and identifies a best frequency response in the plurality of frequency responses, wherein the best frequency response is in response to a specific frequency in the plurality of frequencies. The system then analyzes the downhole formation, in the firing mode, with the specific frequency until a second tuning sequence is initiated.

Additional configurations and variations shall be described throughout this disclosure. The disclosure now turns to a description of the Figures provided.

Figure 1:
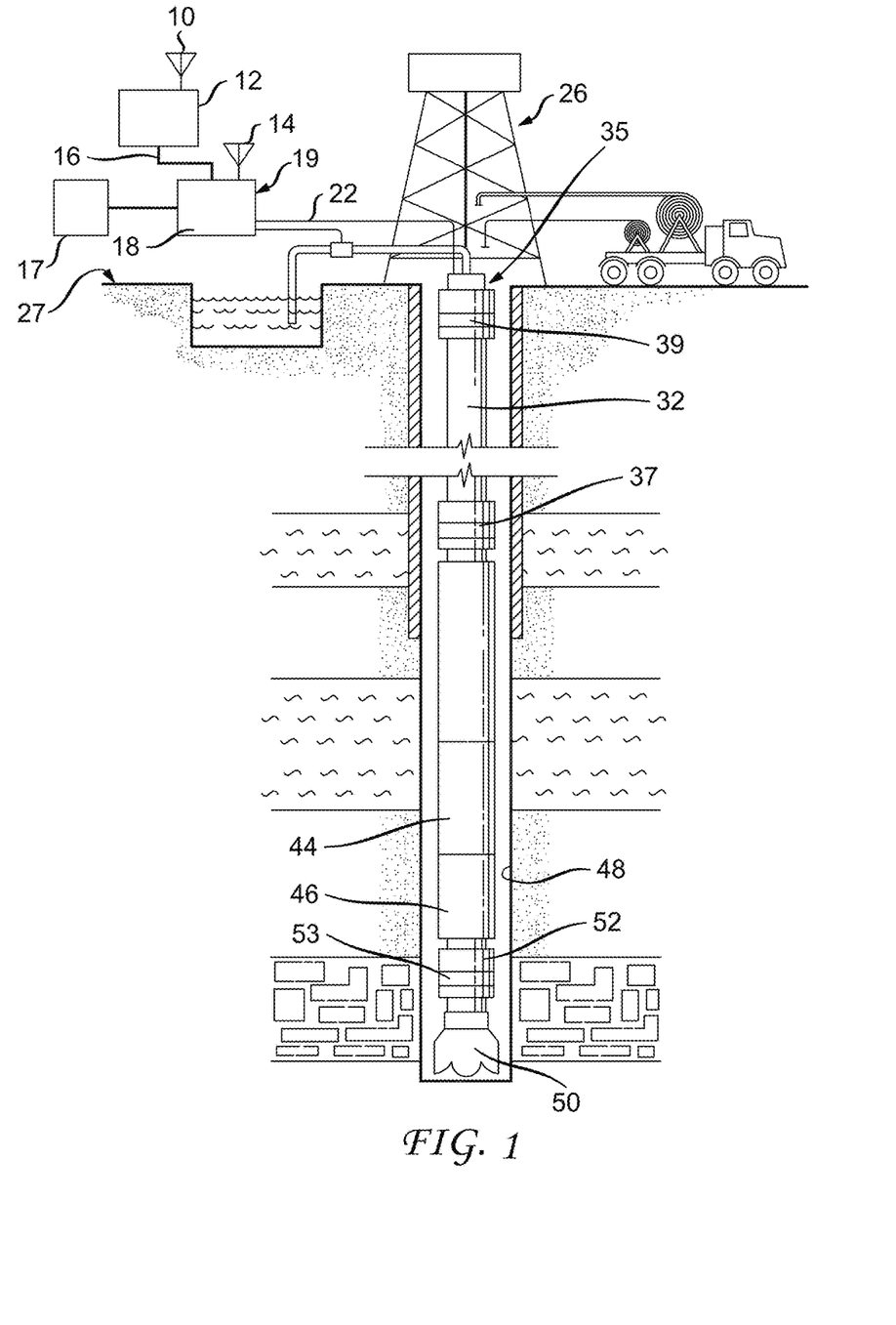
FIG. 1 illustrates a schematic diagram of a system for well logging while drilling a wellbore.

As shown in FIG. 1, the drill string 32 supports several components along its length. A sensor sub-unit 46 is shown for detecting conditions near the drill bit 50, conditions which can include such properties as formation fluid density, temperature and pressure, and azimuthal orientation of the drill bit 50 or string 32. Additionally, measurement while drilling (MWD)/logging while drilling (LWD) procedures are supported both structurally and communicatively. The sensor sub-unit 46 can detect characteristics of the formation surrounding the wellbore 48 proximate the sensor sub-unit 46 such as resistivity and porosity. Therefore, as disclosed herein, the sensor sub-unit 46 can transmit one or multiple frequencies to detect formation characteristics, and can also contain a frequency/wave receiver which can measure how the formation responds to the transmitted waves. Regardless of which conditions or characteristics are sensed, data indicative of those conditions and characteristics is either recorded downhole, for instance at the processor 44, for communication to the surface. The data can be sent to a local processor 18 where the data may be either processed or further transmitted along to a remote processor 12 via wire 16, fiber optic, or wirelessly via antennae 14 and 10.

The sensor sub-unit 46 is located along the drill string 32 above the drill bit 50. The sensor sub-unit 46 can carry a signal processing apparatus 52 for transmitting, receiving, modulating, and otherwise processing signals passing along drill string 32 to and from the surface 27. Additional sensor sub-units 35 can be included as desired in the drill string 32. The sensor sub-unit 46 positioned above the motor 53 has apparatus 52 to communicate with the sensor sub-unit 36 in order to relay information to the surface 27. Communication between the apparatus 52 above the motor 53 and the downhole apparatus 37 of the sensor sub-unit 36 can be accomplished by use of a short hop telemetry system, cabling, or by the fiber optic cabling.

At the surface 27, supported by the drill string 32, a surface sensor sub-unit 35 carries apparatus 39. The surface sensor sub-unit 35 can be supported also by the surface rig 26. Fiber optic signals received at the apparatus 39 may be processed within the apparatus 39 or sent to a surface installation 19 via a communication path 22 for processing.

As shown in FIG. 1, the surface installation 19 includes a transceiver (antennae) 14 that can communicate with the surface sensor sub-unit 35, the personal computer 18 coupled to the transceiver 14 for processing the signals from the sensor sub-units 35, 52, and a real-time clock 17 for time-stamping signals and sensor data from the sensor sub-units. Power for the sensor sub-units and communication apparatuses in the sub-units may be provided as is known in the art.

While various configurations of such assemblies can be created, the bottom hole assembly generally consists of a bit 50, a motor 53, MWD/LWD tools, and the drillpipe, in that order. That is, the motor 53 is above the bit 50, the MWD/LWD tools are above the motor, and the drillpipe continues above the MWD/LWD tools. Communications with downhole tools can occur using any method, including mud-pulse telemetry, electromagnetic telemetry, or wired drill-pipe, or fiber-optic communications.

Figure 2:
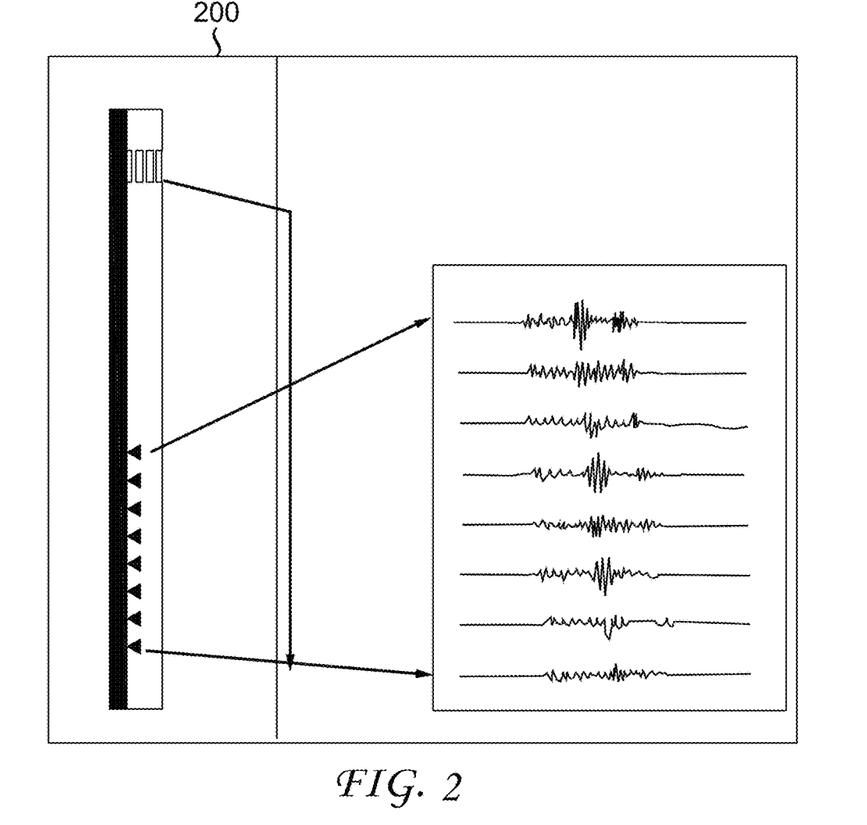
FIG. 2 illustrates sonic transmitters producing sonic outputs.

FIG. 2 illustrates sonic transmitters producing sonic outputs on a downhole tool. As discussed above, the sensor sub-unit 46 illustrated in FIG. 1 can transmit sonic outputs to detect formation characteristics, and can also contain a frequency/wave receiver which can measure how the formation responds to the transmitted waves. The sonic outputs can vary based on frequency, amplitude, bandwidth, number of sonic outputs, or other factors, but will, in a preferred configuration, vary by frequency. The variations of frequency between the sonic outputs can vary, for example, by 0.5 kHz (Kilo-Hertz), 1 kHz, or any other amount.

The variations in frequency, amplitude, and/or bandwidth between sonic outputs can be determined or preset by a user, or alternatively can be determined by a processor on either the downhole tool or surface tools. For example, a user might set sonic outputs to occur with a central frequency variation of 0.5 kHz and a predefined amplitude. Alternatively, a user might set the sonic outputs to occur with a central frequency variation of 1 kHz and variable amplitude. If the system is configured to automatically set such parameters, it can adjust the parameters based on depth, temperature, formation type, and/or specific responses of the formation to specific sonic outputs. For example, if the system detects a first type of formation it can adjust the center frequencies and/or amplitudes as required. Likewise, the number of sonic outputs transmitted through the formation to a receiver unit, as well as the amplitude of those sonic outputs, can be adjusted based on depth, temperature, formation type, and/or specific responses of the formation to specific sonic outputs.

Figure 3:
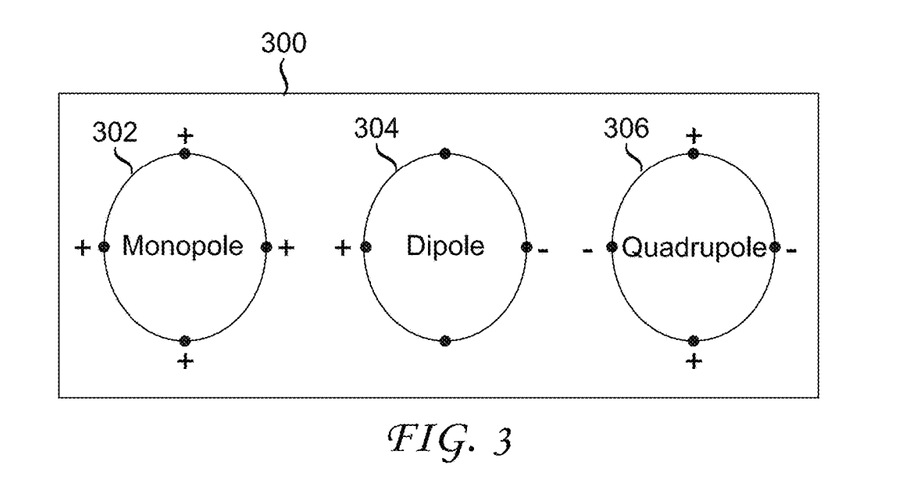
FIG. 3 illustrates antenna configurations.

FIG. 3 illustrates exemplary antenna configurations 300 used to excite the formation. Exemplary antenna configurations include monopole 302, dipole 304, and quadrupole 306 antennas. Typical frequencies used for exciting the formation are in the range of 2-20 kHz, and a system configured according to this disclosure can utilize a single antenna to transmit all acoustic signals, or can have multiple antenna to transmit the acoustic signals. In the preferred configuration, we will use multiple transmitters to excite the borehole, using a combination of monopole, dipole, and quadrupole excitation. For example, if an acoustic signal firing sequence defines five frequencies to be transmitted in a specific order, each of those acoustic signals can be transmitted using a separate transmitter/antenna. Alternatively, each of the acoustic signals could be transmitted using a single antenna, or specific antennas can be designated for frequency ranges. Thus, one antenna could be used for transmitting acoustic signals with frequencies between 2-5 kHz, another antenna could be used for acoustic signals with frequencies between 5 kHz and 10 kHz, and another antenna could be used for acoustic signals between 10 kHz and 20 kHz. The antenna used can be any of the exemplary antenna configurations 300 illustrated, and any combination thereof. In addition, certain configurations can have specific sets of antenna for various circumstances. Thus one circumstance (i.e., a type of formation and/or condition) could use a first set of monopole, dipole, and quadrupole antennas, whereas another circumstance could a second set of monopole, dipole, and quadrupole antennas.

Figure 4:
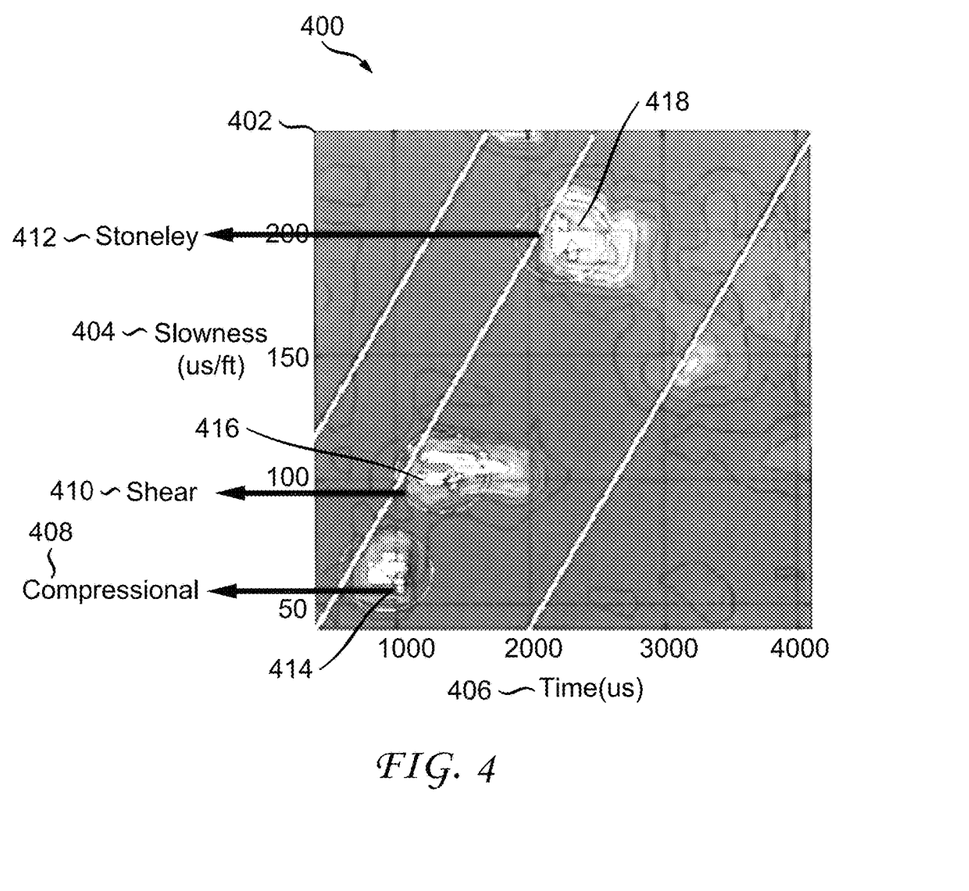
FIG. 4 illustrates a sample semblance plot.

FIG. 4 illustrates a sample semblance plot 400, which measures the strength of acoustic signals as they pass through the formation and are received by an array of acoustic receivers. The signals are plotted using received amplitudes and further based on speed (slowness) 404 and time 406. The peaks 414, 416, 418 correspond to the compressional 408, shear 410, and Stoneley 412 responses of the borehole/formation.

The system, as this data is recorded, can make determinations as to the formation of the borehole by comparing multiple semblances plots (such as illustrated in FIG. 4) to one another. For example, a downhole processor can evaluate the formation based on multiple semblance plots 400 and make determinations as to which frequencies should be used in the next set of acoustic firings. Likewise, such determinations can be made at the surface by another processor or by a human being evaluating the received data.

Figure 5:
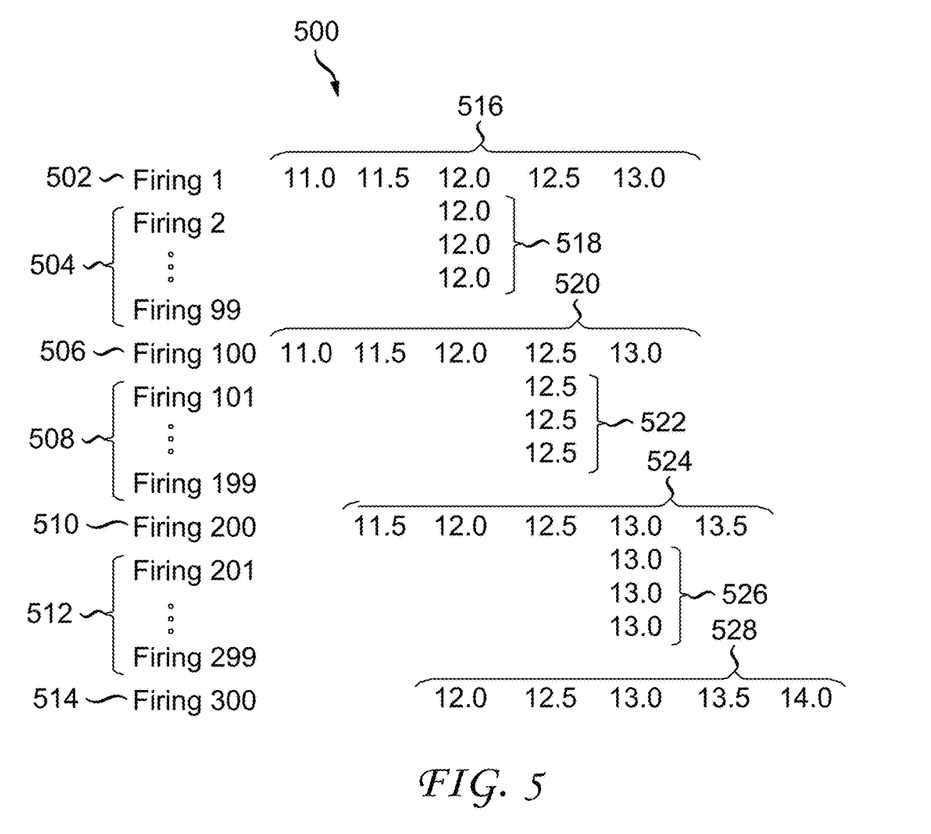
FIG. 5 illustrates an exemplary tuning sequence.

FIG. 5 illustrates an exemplary tuning sequence 500 to determine the best frequency for the formation that the tool is currently in. The tool could exclusively use the best frequencies determined downhole, or use some combination of fixed frequencies and varying "best frequencies" in the sequence of frequencies transmitted/fired through the formation.

In a first configuration, we consider a timed tuning period. In such a configuration, a tuning sequence is initiated, with the purpose of identifying the best frequency for causing resonance within a downhole formation. The tuning sequence can be initiated by a downlink from the surface, can occur in response to a certain condition (e.g., pumps turning off), and/or can be initiated on a timed/periodic basis (i.e., every 5 or 10 minutes). The system then steps through a predetermined sequence 502 of firing frequencies 516 for each mode. FIG. 5 only illustrates a single mode. However, if multiple modes of excitation are being used, a tuning sequence might be as follows:

| Monopole: | 6 kHz | 8 kHz | 10 kHz | 12 kHz | 14 kHz |
| Dipole: | 2 kHz | 3 kHz | 4 kHz | 5 kHz | 6 kHz |
| Quadrupole: | 3 kHz | 3.5 kHz | 4 kHz | 4.5 kHz | 5 kHz |

In such an example, the tool would fire each of the test frequencies assigned to the monopole, then would fire each of the test frequencies assigned to the dipole, and then would fire each of the test frequencies assigned to the quadrupole. Other orders of firing (such as dipole, then monopole, followed by quadrupole) are similarly possible. Each mode would then identify a "best" frequency based on the resonance and the semblance plot generated, which would be used until a subsequent tuning test is performed.

Returning to FIG. 5, we see the initial firing 502, where five initial frequencies 516 are transmitted by an antenna into the formation. The system determines that the optimal or best frequency is 12.0 kHz, and proceeds to use 12.0 kHz 518 for acoustic measurements 2-99 504.

The hundredth firing sequence 506 is another tuning sequence, and the frequencies used 520 in this next tuning sequence are identical to those of the previous tuning sequence 516. However, in this instance the system determines that the optimal frequency for the formation at this point is 12.5 kHz, and proceeds to use 12.5 kHz 522 for the next 99 acoustic measurements 508. The two-hundredth 510 is another tuning sequence, and the frequencies used 524 in this next tuning sequence are not identical to those of the previous tuning sequence 520. Instead, the turning sequence frequencies 524 are shifted such that they are centered on the previously identified best frequency 12.5 kHz 522. However, at this point the system again identifies a different optimal frequency for this point in well—13.0 kHz. The system then uses 13.0 kHz 526 for the next 99 acoustic soundings 512, and again transmits a frequency tuning sequence 528 for the 300$^{th}$ firing 514.

The centering of the tuning frequencies on the previously established best firing frequency can vary according to depth, temperature, formation type, and/or frequencies being used. Thus, in some instances and configurations, the previous best frequency may not be centered in the next tuning sequence. In addition, the spacing or gaps between acoustic frequencies can vary according to depth, temperature, formation type, and/or frequencies being used. For example, as illustrated in FIG. 5, the acoustic frequencies vary by 0.5 kHz. While the frequency difference in acoustic signals can be any other fixed amount (i.e., 1 kHz, 0.2 kHz, 0.75 kHz), the frequency difference between the acoustic signals can vary by different amounts. Examples of such a tuning sequence might be:

| Example 1: | 11.0 | 11.5 | 11.8 | 12 | 12.2 | 12.5 | 13 |
|---|---|---|---|---|---|---|---|
| Example 2: | 2.5 | 2.7 | 3.1 | 3.8 | 5.0 | 7.0 | |

In the first example, the frequency distance is getting smaller as the tuning frequency gets closer to a previously identified best frequency, whereas in the second example the frequency distance increases over time. These and other variations of frequency distance as required by specific circumstances and by user preference are within the scope of this disclosure.

The system seeks to determine which firing frequency gave the best response for each tuning sequence. This can be defined in multiple ways, such as amplitude of a peak within a semblance plot, total area under a peak in the semblance plot, or variations thereof with respect to time. For example, the system can select the frequency which responded best in the previous tuning sequence, or the frequency which has averaged the best response over the past five tuning sequences (i.e., over time).

The best frequency identified can be among all excitation modes (monopole, dipole, or quadrupole), or can be for each individual mode. If the best identified frequency is found for all modes, this could exclude the modes which do not include that frequency. For example, if the best frequency response is found in a dipole excitation mode with 13.5 kHz, use of monopole and quadrupole excitations could be removed until the next tuning sequence. Alternatively, if the best frequency mode is found for each individual mode, there could be a separate frequency for each of monopole, dipole, and quadrupole excitations. As an example, the monopole frequency could be 10 kHz, the dipole frequency could be 6 kHz, and the quadrupole frequency could be 13 kHz. All three of these excitations could then be produced and resulting logs recorded.

In a second configuration, the dynamic tuning of the firing frequencies occurs on an ongoing basis. In this configuration, we start with a firing frequency for each mode, either defined as a fixed starting value or determined through the tuning sequence discussed in the first configuration. The main firing frequency is adjusted by 1 increment (i.e., 1 kHz, 0.1 kHz, 0.01 kHz, etc.) based on if the best response is at a higher or lower frequency, and repeat this process as the tool drills ahead. The periodicity of this dynamic tuning can be user defined or defined based on features of the formation (depth, temperature, formation material, rate of formation change).

Figure 6:
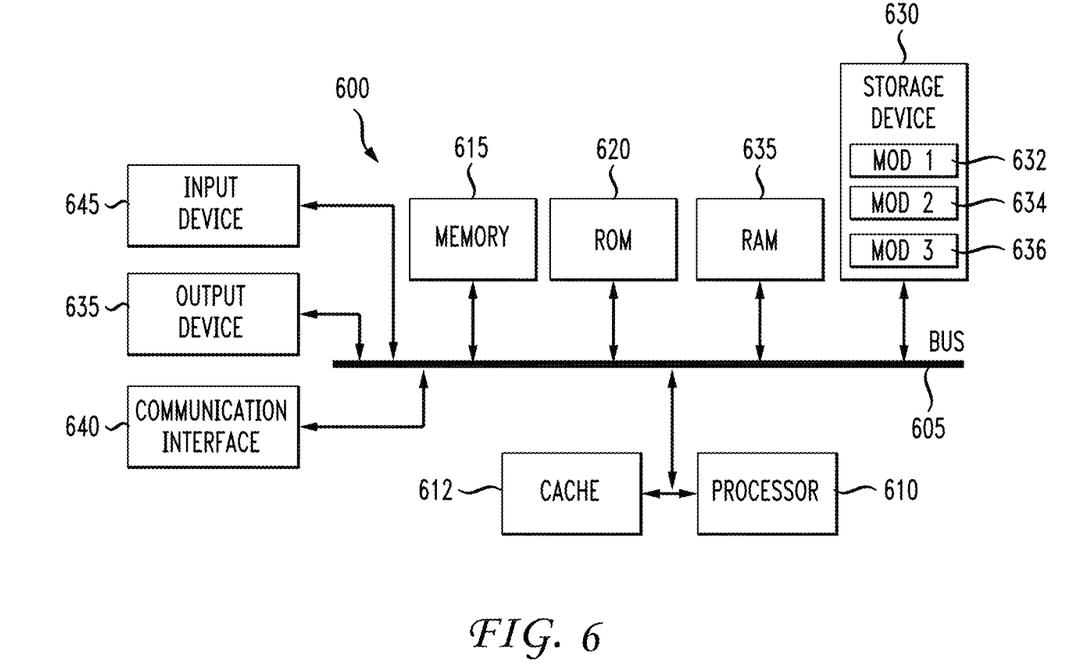
FIG. 6 illustrates an exemplary system embodiment.

FIG. 6 illustrates an exemplary system embodiment which can be employed to practice the concepts, methods, and techniques disclosed herein. With reference to FIG. 6, an exemplary system and/or computing device 600 includes a processing unit (CPU or processor) 610 and a system bus 605 that couples various system components including the system memory 615 such as read only memory (ROM) 620 and random access memory (RAM) 635 to the processor 610. The processors of FIG. 1 (i.e., the downhole processor 44, the local processor 18, and the remote processor 12, can all be forms of this processor 610. The system 600 can include a cache 612 of high-speed memory connected directly with, in close proximity to, or integrated as part of the processor 610. The system 600 copies data from the memory 615 and/or the storage device 630 to the cache 612 for quick access by the processor 610. In this way, the cache provides a performance boost that avoids processor 610 delays while waiting for data. These and other modules can control or be configured to control the processor 610 to perform various operations or actions. Other system memory 615 may be available for use as well. The memory 615 can include multiple different types of memory with different performance characteristics. It can be appreciated that the disclosure may operate on a computing device 600 with more than one processor 610 or on a group or cluster of computing devices networked together to provide greater processing capability. The processor 610 can include any general purpose processor and a hardware module or software module, such as module 1 632, module 2 634, and module 3 636 stored in storage device 630, configured to control the processor 610 as well as a special-purpose processor where software instructions are incorporated into the processor. The processor 610 may be a self-contained computing system, containing multiple cores or processors, a bus, memory controller, cache, etc. A multi-core processor may be symmetric or asymmetric. The processor 610 can include multiple processors, such as a system having multiple, physically separate processors in different sockets, or a system having multiple processor cores on a single physical chip. Similarly, the processor 610 can include multiple distributed processors located in multiple separate computing devices, but working together such as via a communications network. Multiple processors or processor cores can share resources such as memory 615 or the cache 612, or can operate using independent resources. The processor 610 can include one or more of a state machine, an application specific integrated circuit (ASIC), or a programmable gate array (PGA) including a field PGA.

The system bus 605 may be any of several types of bus structures including a memory bus or memory controller, a peripheral bus, and a local bus using any of a variety of bus architectures. A basic input/output (BIOS) stored in ROM 620 or the like, may provide the basic routine that helps to transfer information between elements within the computing device 600, such as during start-up. The computing device 600 further includes storage devices 630 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 630 can include software modules 632, 634, 636 for controlling the processor 610. The system 600 can include other hardware or software modules. The storage device 630 is connected to the system bus 605 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 610, bus 605, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 610 executes instructions to perform "operations", the processor 610 can perform the operations directly and/or facilitate, direct, or cooperate with another device or component to perform the operations.

Although the exemplary embodiment(s) described herein employs the hard disk 630, other types of computer-readable storage devices which can store data that are accessible by a computer, such as magnetic cassettes, flash memory cards, digital versatile disks (DVDs), cartridges, random access memories (RAMs) 635, read only memory (ROM) 620, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 190 represents any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems enable a user to provide multiple types of input to communicate with the computing device 600. The communications interface 640 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 610. The functions these blocks represent may be provided through the use of either shared or dedicated hardware, including, but not limited to, hardware capable of executing software and hardware, such as a processor 610, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 620 for storing software performing the operations described below, and random access memory (RAM) 635 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 610 to perform particular functions according to the programming of the module. For example, FIG. 6 illustrates three modules Mod1 632, Mod2 634 and Mod3 636 which are modules configured to control the processor 610. These modules may be stored on the storage device 630 and loaded into RAM 635 or memory 615 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 610 can include all types of processors disclosed herein, including a virtual processor. However, when referring to a virtual processor, the processor 610 includes the software components associated with executing the virtual processor in a virtualization layer and underlying hardware necessary to execute the virtualization layer. The system 600 can include a physical or virtual processor 610 that receive instructions stored in a computer-readable storage device, which cause the processor 610 to perform certain operations. When referring to a virtual processor 610, the system also includes the underlying physical hardware executing the virtual processor 610.

Figure 7:
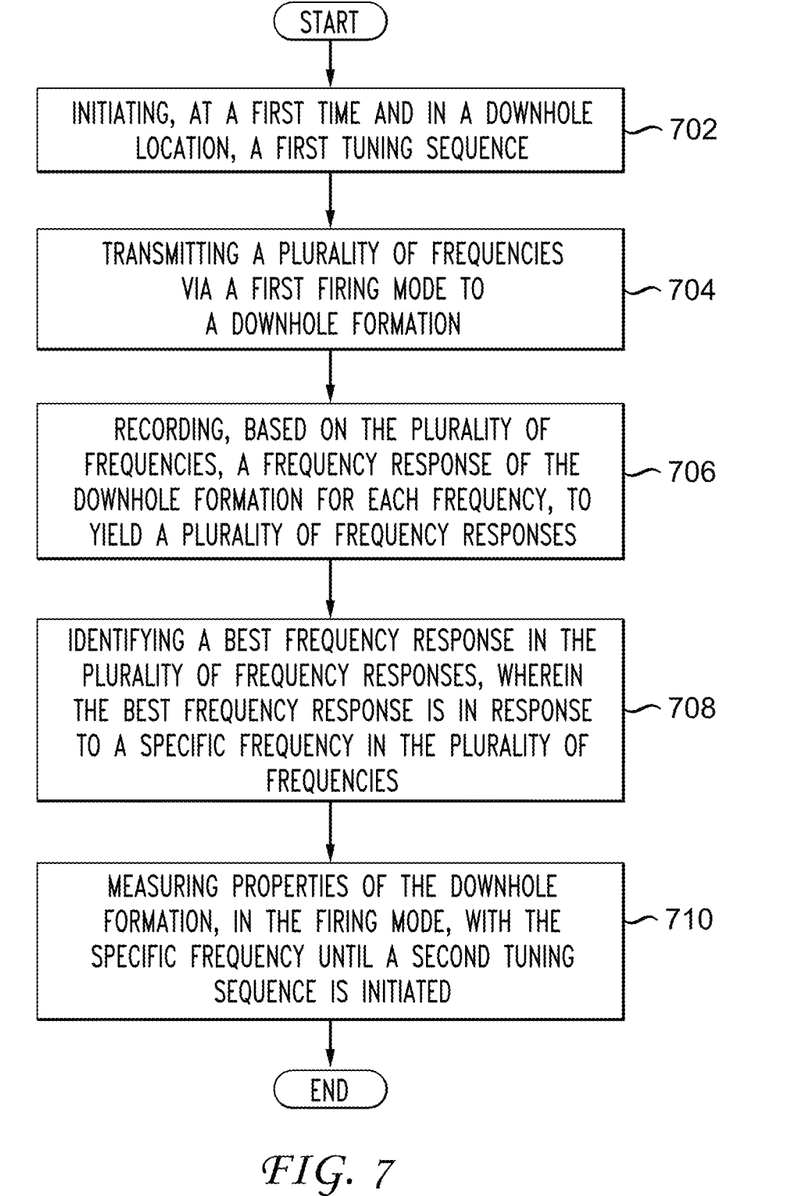
FIG. 7 illustrates an exemplary method embodiment.

Having disclosed some basic system components and concepts, the disclosure now turns to the exemplary method embodiment shown in FIG. 7. For the sake of clarity, the method is described in terms of an exemplary system 600 as shown in FIG. 6 configured to practice the method. The steps outlined herein are exemplary and can be implemented in any combination thereof, including combinations that exclude, add, or modify certain steps.

The system 600 initiates, at a first time and in a downhole location, a first tuning sequence (702). The system 600 transmits a plurality of frequencies via a firing mode to a downhole formation (704) and records, based on the plurality of frequencies, a frequency response of the downhole formation for each frequency, to yield a plurality of frequency responses (706). The system 600 identifies a best frequency response in the plurality of frequency responses, wherein the best frequency response is in response to a specific frequency in the plurality of frequencies (708). The system 600 sounds the downhole formation with the specific frequency until a second tuning sequence is initiated (710).

This process can continue indefinitely as the well is being drilled. The method can further include transmitting a second plurality of frequencies via a second firing mode to the downhole formation, recording, based on the second plurality of frequencies, a second frequency response of the downhole formation for each frequency in the second plurality of frequencies, to yield a second plurality of frequency responses, identifying a second mode best frequency response in the second plurality of frequency responses, wherein the best frequency response is in response to a second frequency in the plurality of frequencies, and sounding the downhole formation, in the second firing mode, with the second frequency until the second tuning sequence is initiated. Exemplary firing modes include a monopole firing mode, a dipole firing mode, and a quadrupole firing mode. The plurality of frequencies and the steps between the frequencies can be based on a previous best frequency, defined by a user, or can be determined by a processor based on characteristics of the formation. The plurality of frequencies can be separated by defined frequency steps or variable frequency steps. The method can further include recording sounding data based on the sounding of the downhole formation, and/or communicating the sounding data to a surface location.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Claim language reciting "at least one of" a set indicates that one member of the set or multiple members of the set satisfy the claim.

Statements of the disclosure include:

Statement 1: A method comprising initiating, at a first time and in a downhole location, a first tuning sequence; transmitting a plurality of frequencies via a firing mode to a downhole formation; recording, based on the plurality of frequencies, a frequency response of the downhole formation for each frequency in the plurality of frequencies, to yield a plurality of frequency responses; identifying a best frequency response in the plurality of frequency responses, wherein the best frequency response is in response to a specific frequency in the plurality of frequencies; and sounding the downhole formation, in the firing mode, with the specific frequency until a second tuning sequence is initiated.

Statement 2: The method of Statement 1, further comprising: transmitting a second plurality of frequencies via a second firing mode to the downhole formation; recording, based on the second plurality of frequencies, a second frequency response of the downhole formation for each frequency in the second plurality of frequencies, to yield a second plurality of frequency responses; identifying a second mode best frequency response in the second plurality of frequency responses, wherein the best frequency response is in response to a second frequency in the plurality of frequencies; and sounding the downhole formation, in the second firing mode, with the second frequency until the second tuning sequence is initiated.

Statement 3: The method Statement 1 or Statement 2, wherein the firing mode is at least one of a monopole firing mode, a dipole firing mode, and a quadrupole firing mode.

Statement 4: The method of any of the preceding Statements, wherein the plurality of frequencies are based on a previous best frequency.

Statement 5: The method of any of the preceding Statements, wherein the plurality of frequencies are separated by defined frequency steps.

Statement 6: The method of Statement 5, wherein the defined frequency steps are user defined.

Statement 7: The method of Statement 5, wherein the defined frequency steps are determined by a processor based on characteristics of the formation.

Statement 8: The method of any of the preceding Statements, further comprising recording sounding data based on the sounding of the downhole formation.

Statement 9: The method of any of the preceding Statements, further comprising communicating the sounding data to a surface location.

Statement 10: A system comprising: a processor; a plurality of acoustic transmitters; a plurality of acoustic receivers; and a computer-readable storage medium having instructions stored which, when executed by the processor, cause the processor to perform operations comprising: initiating, at a first time and in a downhole location, a first tuning sequence; transmitting a plurality of frequencies via a firing mode to a downhole formation; recording, based on the plurality of frequencies, a frequency response of the downhole formation for each frequency in the plurality of frequencies, to yield a plurality of frequency responses; identifying a best frequency response in the plurality of frequency responses, wherein the best frequency response is in response to a specific frequency in the plurality of frequencies; and sounding the downhole formation, in the firing mode, with the specific frequency until a second tuning sequence is initiated.

Statement 11: The system of Statement 10, the computer-readable storage medium having additional instructions stored which, when executed by the processor, cause the processor to perform operations comprising: transmitting a second plurality of frequencies via a second firing mode to the downhole formation; recording, based on the second plurality of frequencies, a second frequency response of the downhole formation for each frequency in the second plurality of frequencies, to yield a second plurality of frequency responses; identifying a second mode best frequency response in the second plurality of frequency responses, wherein the best frequency response is in response to a second frequency in the plurality of frequencies; and sounding the downhole formation, in the second firing mode, with the second frequency until the second tuning sequence is initiated.

Statement 12: The system of Statement 10 or Statement 11, wherein the firing mode is at least one of a monopole firing mode, a dipole firing mode, and a quadrupole firing mode.

Statement 13: The system of any of Statements 10-12, wherein the plurality of frequencies are based on a previous best frequency.

Statement 14: The system of any of Statements 10-13, wherein the plurality of frequencies are separated by defined frequency steps.

Statement 15: The system of Statement 14, wherein the defined frequency steps are user defined.

Statement 16: The system of Statement 14, wherein the defined frequency steps are determined by a processor based on characteristics of the formation.

Statement 17: The system of any of Statements 10-16, the computer-readable storage medium having additional instructions stored which, when executed by the processor, cause the processor to perform operations comprising recording sounding data based on the sounding of the downhole formation.

Statement 18: The system of any of Statements 10-17, the computer-readable storage medium having additional instructions stored which, when executed by the processor, cause the processor to perform operations comprising communicating the sounding data to a surface location.

Statement 19: A computer-readable storage device having instructions stored which, when executed by a computing device, cause the computing device to perform operations comprising: initiating, at a first time and in a downhole location, a first tuning sequence; transmitting a plurality of frequencies via a firing mode to a downhole formation; recording, based on the plurality of frequencies, a frequency response of the downhole formation for each frequency in the plurality of frequencies, to yield a plurality of frequency responses; identifying a best frequency response in the plurality of frequency responses, wherein the best frequency response is in response to a specific frequency in the plurality of frequencies; and sounding the downhole formation, in the firing mode, with the specific frequency until a second tuning sequence is initiated.

Statement 20: The computer-readable storage device of Statement 19, having additional instructions stored which, when executed by the computing device, cause the computing device to perform operations comprising: transmitting a second plurality of frequencies via a second firing mode to the downhole formation; recording, based on the second plurality of frequencies, a second frequency response of the downhole formation for each frequency in the second plurality of frequencies, to yield a second plurality of frequency responses; identifying a second mode best frequency response in the second plurality of frequency responses, wherein the best frequency response is in response to a second frequency in the plurality of frequencies; and sounding the downhole formation, in the second firing mode, with the second frequency until the second tuning sequence is initiated.

Statement 21: The computer-readable storage device of Statement 19 or Statement 20, wherein the firing mode is at least one of a monopole firing mode, a dipole firing mode, and a quadrupole firing mode.

Statement 22: The computer-readable storage device of any of Statements 19-21, wherein the plurality of frequencies are based on a previous best frequency.

Statement 23: The computer-readable storage device of any of Statements 19-22, wherein the plurality of frequencies are separated by defined frequency steps.

Statement 24: The computer-readable storage device of Statement 23, wherein the defined frequency steps are user defined.

Statement 25: The computer-readable storage device of Statement 23, wherein the defined frequency steps are determined by a processor based on characteristics of the formation.

Statement 26: The computer-readable storage device of any of Statements 19-25, having additional instructions stored which, when executed by the computing device, cause the computing device to perform operations comprising recording sounding data based on the sounding of the downhole formation.

Statement 27: The computer-readable storage device of any of Statements 19-26, having additional instructions stored which, when executed by the computing device, cause the computing device to perform operations comprising communicating the sounding data to a surface location.

The various embodiments and configurations described above are provided by way of illustration only and should not be construed to limit the scope of the disclosure. For example, the principles herein can be applied to any drilling operation, regardless of the composition of the communication path. Various modifications and changes may be made to the principles described herein without following the example embodiments and applications illustrated and described herein, and without departing from the spirit and scope of the disclosure.

I claim:

1. A method comprising:
   initiating, at a first time and in a downhole location, a first tuning sequence, wherein initiating the first tuning sequence involves transmitting a plurality of frequencies via a first firing mode to a downhole formation;
   recording, based on the plurality of frequencies, a frequency response of the downhole formation for each frequency in the plurality of frequencies, to yield a plurality of frequency responses;
   identifying a first mode best frequency response, based on a semblance plot, in the plurality of frequency responses, wherein the first mode best frequency response is in response to a specific frequency in the plurality of frequencies; and measuring properties of the downhole formation, in the firing mode, with the specific frequency until a second tuning sequence is initiated.

2. The method of claim 1, further comprising:
   initiating, at a second time and in a downhole location, a second tuning sequence, wherein initiating the second tuning sequence involves transmitting a plurality of frequencies via a second firing mode to a downhole formation;
   recording, based on the second plurality of frequencies, a second frequency response of the downhole formation for each frequency in the second plurality of frequencies, to yield a second plurality of frequency responses;
   identifying a second mode best frequency response, based on a semblance plot, in the second plurality of frequency responses, wherein the second mode best frequency response is in response to a second frequency in the plurality of frequencies; and
   sounding the downhole formation, in the second firing mode, with the second frequency until the second tuning sequence is initiated.

3. The method of claim 1, wherein the firing mode is a dipole firing mode.

4. The method of claim 1, wherein the firing mode is a monopole firing mode.

5. The method of claim 1, wherein the plurality of frequencies are based on a previous best frequency.

6. The method of claim 1, wherein the plurality of frequencies are separated by defined frequency steps.

7. The method of claim 6, wherein the defined frequency steps are user defined.

8. The method of claim 1, further comprising recording sounding data based on the measuring properties of the downhole formation.

9. The method of claim 8, further comprising communicating the sounding data to a surface location.

10. A system comprising:
    a processor;
    a plurality of acoustic transmitters;
    an acoustic receiver; and
    a computer-readable storage medium having instructions stored which, when executed by the processor, cause the processor to perform operations comprising:
       initiating, at a first time and in a downhole location, a first tuning sequence, wherein initiating the first tuning sequence involves transmitting, through the plurality of acoustic transmitters, a plurality of frequencies via a first firing mode to a downhole formation;
       recording, based on the plurality of frequencies and at the acoustic receiver, a frequency response of the downhole formation for each frequency in the plurality of frequencies, to yield a plurality of frequency responses;
       identifying a first mode best frequency response, based on a semblance plot, in the plurality of frequency responses, wherein the first mode best frequency response is in response to a specific frequency in the plurality of frequencies; and
       sounding the downhole formation, in the firing mode, with the specific frequency until a second tuning sequence is initiated.

11. The system of claim 10, the computer-readable storage medium having additional instructions stored which, when executed by the processor, cause the processor to perform operations comprising:

initiating, at a second time and in a downhole location, a second tuning sequence, wherein initiating the second tuning sequence involves transmitting a plurality of frequencies via a second firing mode to a downhole formation recording, based on the second plurality of frequencies, a second frequency response of the downhole formation for each frequency in the second plurality of frequencies, to yield a second plurality of frequency responses;

identifying a second mode best frequency response, based on a semblance plot, in the second plurality of frequency responses, wherein the second mode best frequency response is in response to a second frequency in the plurality of frequencies; and sounding the downhole formation, in the second firing mode, with the second frequency until the second tuning sequence is initiated.

12. The system of claim 10, wherein the firing mode is a dipole firing mode.

13. The system of claim 10, wherein the firing mode is a monopole firing mode.

14. The system of claim 10, wherein the plurality of frequencies are based on a previous best frequency.

15. The system of claim 10, wherein the plurality of frequencies are separated by defined frequency steps.

16. The system of claim 15, wherein the defined frequency steps are user defined.

17. The system of claim 10, the computer-readable storage medium having additional instructions stored which, when executed by the processor, cause the processor to perform operations comprising recording sounding data based on the sounding of the downhole formation.

18. The system of claim 17, the computer-readable storage medium having additional instructions stored which, when executed by the processor, cause the processor to perform operations comprising communicating the sounding data to a surface location.

19. A computer-readable storage device having instructions stored which, when executed by a computing device, cause the computing device to perform operations comprising:

initiating, at a first time and in a downhole location, a first tuning sequence, wherein initiating the first tuning sequence involves transmitting, through the plurality of acoustic transmitters, a plurality of frequencies via a first firing mode to a downhole formation;

recording, based on the plurality of frequencies and at an acoustic receiver, a frequency response of the downhole formation for each frequency in the plurality of frequencies, to yield a plurality of frequency responses;

identifying a first mode best frequency response, based on a semblance plot, in the plurality of frequency responses, wherein the first mode best frequency response is in response to a specific frequency in the plurality of frequencies; and measuring properties of the downhole formation, in the firing mode, with the specific frequency until a second tuning sequence is initiated.

20. The computer-readable storage device of claim 19, having additional instructions stored which, when executed by the processor, cause the processor to perform operations comprising:

initiating, at a second time and in a downhole location, a second tuning sequence, wherein initiating the second tuning sequence involves transmitting a plurality of frequencies via a second firing mode to a downhole formation;

recording, based on the second plurality of frequencies, a second frequency response of the downhole formation for each frequency in the second plurality of frequencies, to yield a second plurality of frequency responses;

identifying a second mode best frequency response, based on a semblance plot, in the second plurality of frequency responses, wherein the second mode best frequency response is in response to a second frequency in the plurality of frequencies; and measuring properties of the downhole formation, in the second firing mode, with the second frequency until the second tuning sequence is initiated.

* * * * *